Dec. 11, 1962 T. M. COLE 3,068,379
CIRCUIT PROTECTIVE APPARATUS
Filed April 11, 1957 2 Sheets-Sheet 1
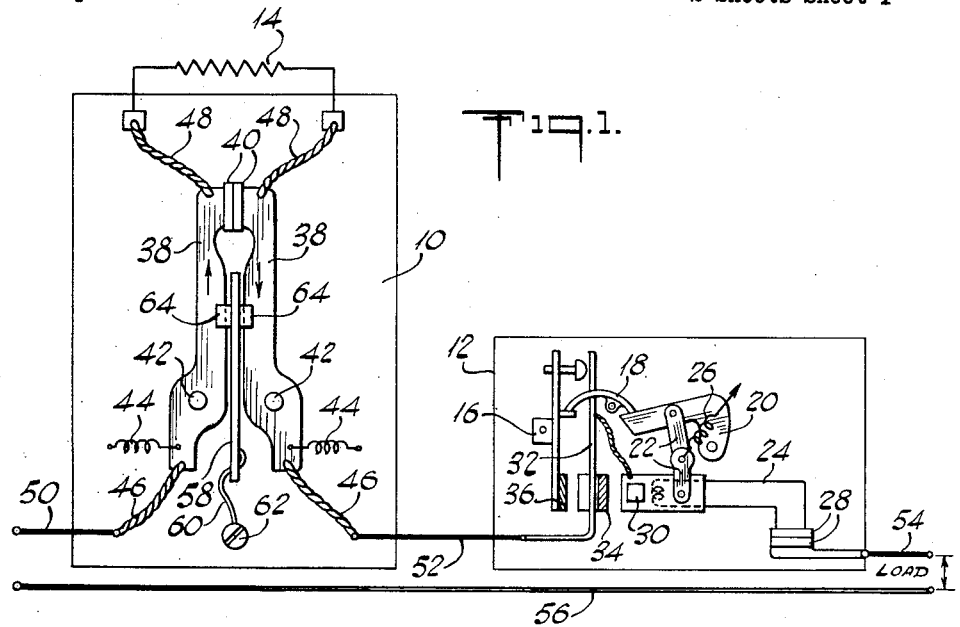
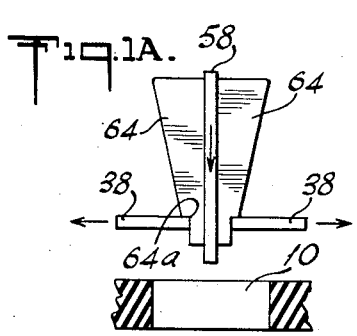
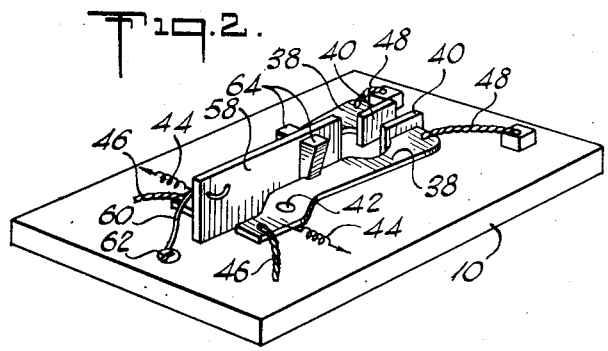
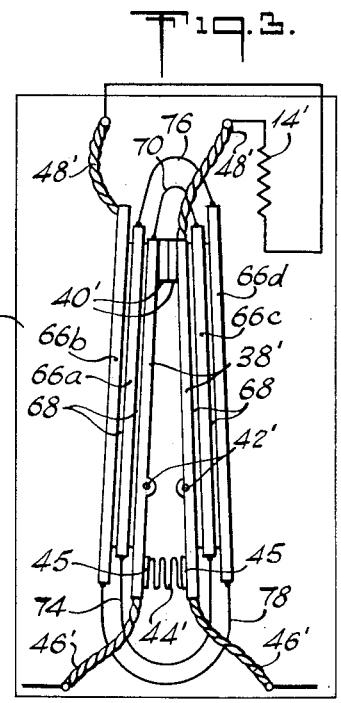
INVENTOR
THOMAS M. COLE
BY Paul S. Martin
ATTORNEY Dec. 11, 1962 T. M. COLE 3,068,379
CIRCUIT PROTECTIVE APPARATUS
Filed April 11, 1957 2 Sheets-Sheet 2
Fig.4.
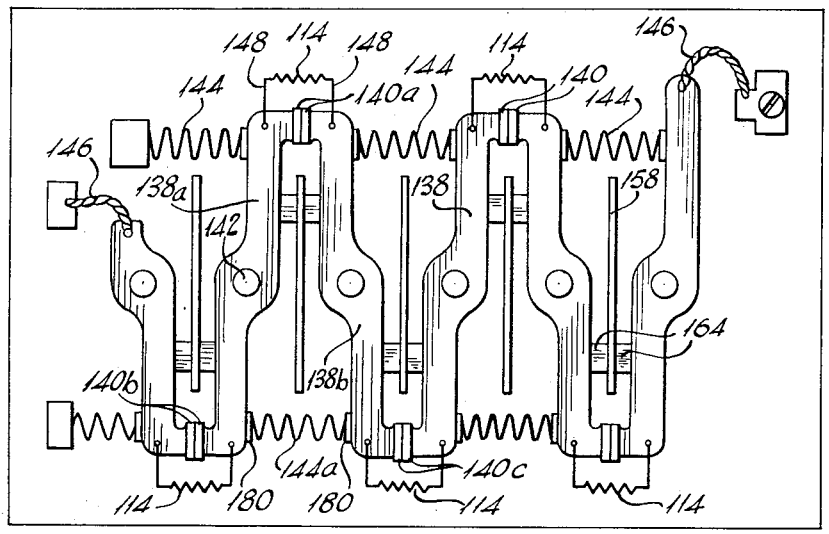
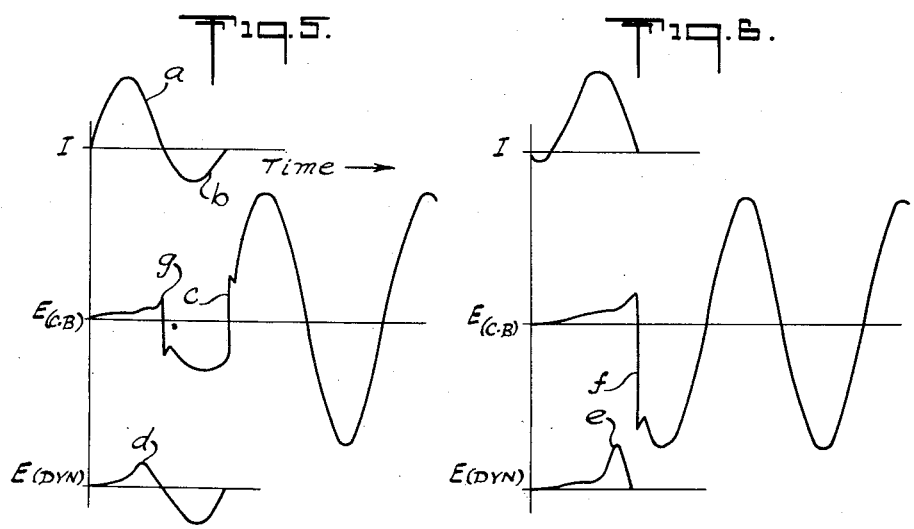
Fig.5.  Fig.6.
INVENTOR
THOMAS M. COLE
BY Paul J. Martin
ATTORNEY

United States Patent Office 3,068,379
Patented Dec. 11, 1962

3,068,379
CIRCUIT PROTECTIVE APPARATUS
Thomas M. Cole, Harrison, N.Y., assignor to Federal Pacific Electric Company, a corporation of Delaware
Filed Apr. 11, 1957, Ser. No. 652,304
24 Claims. (Cl. 317—58)

The present invention relates to protective apparatus for electrical circuits.

A standard form of protective device for power circuits, the circuit breaker, has a number of exacting requirements to meet. A circuit breaker may have a nominal load-protecting rating of 100 amperes, for example; and the same circuit breaker may be required to withstand a 5,000 ampere current resulting from a short-circuit of the power line at the load side of the circuit breaker. The short-circuit current that flows depends upon the capacity of the power supply to deliver a heavy current in the event of short circuit. With increasing current levels required by loads, the capacity of power supply lines in typical installations has increased over the years, so that it has become desirable to increase the capacity of a circuit breaker having the same load-protecting rating, 100 amperes in the above example, so that such a circuit breaker will withstand short-circuit currents greatly in excess of the above short-circuit current of 5,000 amperes.

To redesign circuit breakers of current manufactured designs so as to enable them to withstand the much heavier short circuit currents presently contemplated would greatly increase their cost and their bulk.

One obvious approach to the use of the current designs of circuit breakers to enable them to handle the much heavier short-circuit currents that might flow, is to use a fast-acting fuse of much heavier load current rating than that of the circuit breaker but of low enough current rating to blow in the event of a short circuit. In this way the circuit breaker which opens after the fuse has interrupted the circuit is not required to interrupt the heavy arcing current that would otherwise flow in the absence of the fuse. However, circuit breakers are used in place of fuses in order that protection may be available which does not require replacement of a part when it becomes necessary to reestablish the circuit. Where fuses are used together with circuit breakers and the fuses blow in the event of a short circuit, it is of course necessary to replace the fuses, and this defeats much of the advantage of circuit breakers.

An object of the present invention is to extend the use of circuit breakers capable of withstanding moderate short circuits to applications where much heavier short circuit currents are to be expected. A related object of this invention is to limit the current that flows through a circuit breaker when the circuit breaker is tripped to open and interrupt the circuit.

In achieving this object, in accordance with the illustrative disclosure to follow, means is provided for inserting a current-limiting resistor or series of resistors in response to a short circuit occurring, which means is faster-acting than the circuit breaker. In other words, the novel apparatus involves one or more pairs of contacts connected in series with the circuit breaker, which contacts open faster than the contacts of the circuit breaker can be opened mechanically; and when the protective contacts in series with the circuit breaker open, protective impedance, advantageously resistance, is inserted in the circuit and remains in the circuit to limit the short-circuit current flowing during the later mechanical opening of the circuit breaker contacts. A feature of this invention is the reliance upon electrodynamic action of the short circuit itself to blow the contacts apart. Using contact carriers in the electrodynamic impedance inserter that are at least as fast-acting as those in the circuit breaker, because of their natural physical characteristics as determined by mass, dimensions, etc., and recognizing that a certain amount of time is involved in first electrically tripping the circuit breaker and then in mechanically operating the circuit breaker mechanism to separate the contacts, a reliable, fast- and consistent-acting mechanism is provided for injecting the protective series resistance for the slower circuit breaker.

An additional feature of the invention relates to the application of such a protective system to alternating-current circuits. It will be recognized that in alternating current circuits, the electrodynamic force developed between a pair of conductors as a result of the current flowing will be a force which rises from zero to a maximum and drops back to zero once during each half-cycle of alternating current.

During short circuits wherein extremely heavy currents flow, electrodynamically parted contacts will fly apart and, because of the inertia of the contact arm or arms, the contacts will remain parted even during the successive twice-per-cycle momentary drops in the electrodynamic force which separated them. However, the same device may be called upon to function in a circuit where a lower value of current is effective to part the contacts initially. The contacts would tend to reclose as the current drops to zero twice during each alternating current cycle, and the electrodynamic force decays early enough in each half-cycle to permit reclosing. If the contacts were allowed to separate, reengage, separate, and reengage in a vibratory manner, the contacts would weld together and the protective system would fail. A further feature of the invention, therefore, is in the provision of means for preventing reengagement of the electrodynamically parted contacts whether the separation between the contacts results from a very heavy short circuit current or one that is only marginally effective to part the electrodynamically operated impedance-injecting contacts. A further aspect of the invention, accordingly, resides in the provision of novel forms of current-limiting apparatus and particularly in the provision of such apparatus which is designed for alternating current use.

A still further feature of this invention relates to an improvement in electrodynamically operated impedance-injecting contacts that are effective to inject series impedance into a circuit, which thereby reduces the current through the contacts and which also would reduce the separating force to allow harmful reclosing. In accordance with this feature of the invention, means is provided for multiplying the separating force that would exist between the contacts as a result of the drop in current flowing after insertion of the current-limiting impedance. Additional objects and features of novelty will be appreciated from the following detailed description of a few illustrative embodiments of the invention. In the drawings which illustrate these embodiments:

FIG. 1 is a diagrammatic illustration of a circuit breaker and an electrodynamically operated pair of contacts, in which the latter are physically represented and shown in plan view; FIG. 1a is a transverse section along line 1A—1A therein;

FIG. 2 is a perspective view of the electrodynamically operated contact device in FIG. 1;

FIG. 3 is a plan view of a modified device embodying further features of the present invention;

FIG. 4 is a further modification of the electrodynamic contact device forming part of FIG. 1 and shown in FIG. 2; and FIGS. 5 and 6 are curves illustrating the operation of the apparatus in FIG. 1.

Referring now to FIG. 1, there is shown an electrodynamically operated contact device 10 connected electrically in series with a circuit breaker 12. The contacts of device 10 part under short-circuit conditions to insert current-limiting impedance in series with circuit breaker 12, such as resistor 14.

Circuit breaker 12 is typically one of the so-called molded-case circuit breakers of the "low-voltage" classification. Circuit breaker 12 is illustrated diagrammatically as including a pivoted trip bar 16 which acts as a latch restraining the pivoted secondary latch 18, which in turn restrains the cradle 20. The latter, acting through over-center toggle 22, holds moving contact arm 24 in its closed position as illustrated. When trip bar 16 rocks counterclockwise, cradle 20 swings clockwise and releases toggle 22 to thereby allow tension spring 26 to raise contact arm 24 and separate the contacts 28 of the circuit breaker. Contact arm 24 is illustrated as mounted on pivoted shaft 30.

Trip bar 16 is capable of being operated in counterclockwise direction for tripping the circuit breaker after appreciable delay when a bimetal 32 is overheated by a moderate overload. A yoke of soft iron 34, having legs which flank bimetal 32, is arranged to attract an armature 36 carried by the trip bar 16 and trip the circuit breaker quickly in the event of a heavy overload. This magnetic trip operates during the first full half-cycle (or major portion of a half-cycle) following a short circuit and therefore acts very fast in tripping the circuit breaker mechanism and allows spring 26 to separate the contacts. For further details of the circuit breaker in FIG. 1, see Patent No. 2,673,264, issued to Thomas M. Cole, the present inventor, on March 23, 1954.

The device 10 previously mentioned includes a pair of contact arms 38 bearing contacts 40 that are spring biased against each other and about pivots 42 by tension springs 44. The spring biased ends of contact arms 38 have flexible braid leads 46, and the ends of contact arms 38 adjacent contacts 40 have a pair of flexible braid leads 48. A circuit may be traced from one power supply lead 50 through the left-hand braid 46, contact arm 38, and contact 40, to the right-hand contact 40, contact arm 38, braid 46, conductor 52, and through circuit breaker 12 to the load conductor 54. The return circuit from the load to the power source extends along the line 56. Resistor 14 is connected to the flexible braid 48, as a bridge across contacts 40 with the contacts closed. The resistor or other suitable impedance is short-circuited or by-passed by contacts 40 when closed.

In the event of a short circuit occurring at the load end of the circuit shown, the current through contact arms 38 rises abruptly. Because of the electrodynamic forces resulting from currents flowing in opposite directions in the two arms 38, those arms repel each other and separate contacts 40. As soon as this occurs, the current is reduced since there no longer is a direct path to the circuit breaker through the contacts but, instead, there is additional impedance inserted in series with the circuit breaker, namely resistor 14. It will be recognized of course that the short circuit current that flows will depend upon the impedance of the wiring between the circuit breaker and the location of the short circuit; and it will also depend upon the impedance of the power supply line.

Assuming that a very heavy short circuit occurs, contacts 40 will be blown apart. The contacts will stay apart if the limited current should remain relatively high. The reversal of contact arms to close the contacts is also retarded by the momentum of the arms moving in the opening direction. Under the foregoing conditions, whether the current be direct current or alternating current, the contacts 40 will remain separated until contacts 28 are mechanically parted and resistor 14 will limit the current through the circuit breaker 12 to a safe value. The delay in opening of the circuit breaker due to the inertia of the contact-opening mechanism and due to functioning of trip mechanism 34, 36, 16, 18, 20, is inherently longer than that required for the electrodynamic parting of the contacts 40.

It may be that the initial impulse which blows the contacts 40 apart in response to severe short circuit current flowing through arms 38, 38 is adequate to keep the contacts 40 parted until the circuit breaker can clear the circuit. However, it sometimes occurs that the initial impulse is inadequate to keep the contact arms 38 apart, and that the reduced current flowing along arms 38 and through impedance element 14 is inadequate to maintain the electrodynamic force of sufficient strength to overcome return springs 44. The contacts 40 might reclose, the current through the circuit breaker would not be limited, and welding of the contacts 40 might result. To avoid this, the following additional mechanisms shown in FIGS. 1 and 2 are provided.

In FIG. 2 a plate 58, preferably of insulating material, is shown carried by a spring arm 60 having a fixed end 62, and this plate 58 carries a pair of reversely tapered wedges 64 on opposite sides thereof which engage the respective contact arms 38. As soon as those contact arms are separated for a short distance, wedges 64 will be driven down to fill the space by spring 60 and to keep the contacts apart. The circuit breaker 12 is of a sensitivity to be tripped for all current levels sufficient to cause operation of current-limiting unit 10 and therefore the circuit breaker will be tripped and will clear the circuit immediately afterward. In restoring service, it becomes necessary only to lift plate 58 in position to allow springs 44 to press contacts 40 together.

It will be readily appreciated that contacts 40 are pressed against each other by springs 44 so as to remain in contact for very low values of current and for all values below that at which the electrodynamic separating force does not exceed the spring bias. In the event of marginal currents, and particularly in the case of alternating currents where the forces due to momentary current peaks may exceed the spring bias, a tendency of arms 38 to vibrate slightly might develop without causing effective parting of contacts 40 so as to insert resistor 14 in the circuit. The occurrence of such marginal currents is not very likely. However, to allow reclosing of the contacts and short-circuiting of resistor 14 thereafter, wedges 64 are provided with shoulders 64a (FIG. 1A) which rest on the upper faces of contact arms 38 when the contacts 40 are closed. In the event of minor vibration of contact arms 38 tending to produce slight separation between contacts 40, shoulders 64a remain in sliding contact with contact arms 38 and prevent wedges 64 from being driven between those contact arms. Contacts 40 consequently are effective to remain closed and short circuit resistor 14 following such slight marginal current and without the necessity of resetting or restoring plate 58.

FIGS. 5 and 6 illustrate operation of the system of FIG. 1 with adequate short-circuit current for proper operation of the device in FIG. 1. The vertical line represents the moment when a short circuit is developed and when short-circuit current commences to flow. The current I is represented by the uppermost curve of the three, and involves a positive swing and a negative swing. The middle curve of the three E (C.B.) represents the voltage developed across the circuit breaker 12. The lowermost curve of the three represents the voltage E (DYN.) developed across resistor 14 and dynamic contact device 10 between flexible leads 46.

In FIG. 5, during the positive excursion a, a current which reaches a peak value (R.M.S.) of 8350 amperes flows through the two devices 10 and 12. This current developes an electrodynamic force which blows contacts 40 apart. Initially, while arcing occurs between contacts 40, the voltage E (DYN.) developed across the device 10 remained small despite the heavy current flowing. However, when arcing ceased, the voltage drop in unit 10 was essentially that which resulted from the flow of current through the device 14. This reached a peak value *d* of 232 volts (R.M.S.) in the operation. During this first half-cycle following the short-circuit, the current through arms 38 decreased after the peak both as a result of the injection of resistor 14 as a current limiting resistor and as a result of the alternating current wave which normally decays and ultimately crosses the zero line to rise in the reverse direction. This reduction in current caused the force repelling arms 38 from each other to disappear. If there were any tendency of these arms to close again by virtue of springs 44 overcoming the opening-motion impetus of those contact arms, the contacts 40 would nevertheless be prevented from reengaging each other by virtue of spring-driven wedges 64 engaging arms 38. The current reached a positive peak of 8850 amperes during the first portion of the operation after short circuit, but the reverse half-cycle of current *b* reached a peak of only 3850 amperes. This illustrates the current limiting effect of the resistance 14.

The voltage drop across device 10 is seen to be a smooth curve crossing the horizontal or zero axis of the bottom curve and continuing in sine-wave form thereafter. Arcing across contacts 40 ceased at peak *d* some time before the current crossed through zero, so that both the current through circuit breaker 12 and the voltage impressed across that circuit breaker are limited by the volt drop across element 14. Both factors reduce the required interrupting capacity of the circuit breaker. In the FIG. 5 curves, the volt-drop during the current-limited second half-cycle of operation after short circuit is evidently divided approximately equally between the circuit breaker and the current limiting device. At the end of the second half-cycle of operation, actually 0.867 of a cycle after short-circuit, the center curve shows that a voltage drop E (C.B.) across the circuit breaker includes a nearly vertical line *c* representing interruption of the circuit. Thereafter the full sine-wave voltage available from the source of supply is impressed across the circuit breaker itself.

The operation as represented in FIG. 5 resulted from a short circuit occurring at about 60 degrees in point of time after the voltage wave left its zero value. Tripping of the circuit breaker 12 and mechanical separation of its contacts at *g* occurred distinctly after device 10 was brought into full effect.

The total time for operation of the circuit breaker is a variable which depends in part on the time in the cycle when the short circuit occurs, for the tripping results from the magnetic attraction of armature 36 resulting from current flowing through bimetal 32 flanked by the U-shaped core 34. It is possible under special circumstances for tripping of the circuit breaker to occur at a critical time such that the circuit breaker interrupts the circuit after little more than a half-cycle. This is illustrated in the operation of FIG. 6, wherein the top curve of the three reached a peak value of 9,620 amperes (R.M.S.) so that there was no great reduction in the value of current flowing prior to reaching the peak. During the decline of the current from its peak value, the electrodynamic device operated and a peak value of voltage *e* is seen to develop in the bottom curve representing insertion of resistor 14 by device 10 at a time prior to interruption of the circuit, which took place 0.685 cycle after the short circuit occurred, as indicated by the line *f* that leads into the open-circuit sine-wave voltage E (C.B.).

As in FIG. 5, both the voltage across the circuit breaker and the voltage across the electrodynamic switching device are seen to depart somewhat from zero at a time when the heavy currents flow. In the circuit breaker, this was due to inadequate contact pressure, but is of no significance here.

In FIG. 6 the circuit interruption occurs at a time when the current is naturally approaching zero and this is also true in FIG. 5. The current and the voltage are in phase with each other because of the resistive character of the impedance injected in the circuit which promotes cleaner interruption than in the case of a prominently reactive circuit. The resistor 14 employed in the operations represented in FIGS. 5 and 6 was of tungsten and of such limited thermal capacity that it rose in temperature to glowing heat. Its cold resistance at the instant of being inserted in the circuit was low, and this factor facilitated clean opening of contacts 40, with a minimum of arcing. The resistance quickly increased due to the positive thermal coefficient of resistance of tungsten, and therefore became highly effective in current-limiting. The circuit breaker in the operation of FIGS. 5 and 6 had relatively heavy spring contact pressure, of the order of one and a quarter to two and a half pounds. The electrodynamic switching unit in the illustrative operation had a contact pressure of 12 ounces. This not only promoted sensitive response to the electrodynamic forces produced by the currents through the contact arms and relatively wide contact separation, but it also produced an early response in the alternating current wave and thus reduced the inherent blow-off effect at the circuit breaker contacts.

It should be observed that the foregoing operation of devices 10 with circuit breakers of the types indicated is noteworthy because those circuit-breakers are unusually fast in response to overloads. Heavier circuit breakers would assuredly open much later than the current limiting quickly accomplished with device 10.

It was previously mentioned that the current flowing through the electrodynamically separated contact arms is reduced when the resistor is inserted into the circuit and that this diminishes the elemtrodynamic blow-apart force of contacts 40. This blow-apart force can be increased if desired by constructing the device according to FIG. 3. Contacts 40' are carried by a pair of contact arms 38', pivoted at 42'. A single spring 44' is illustrated in FIG. 3 to provide contact pressure, and has insulating wafers 45 at its ends. The normal circuit through the device of FIG. 3 extends through the flexible connectors 46', contact arms 38' and contacts 40', entering one braid 46' and leaving via the other. In the device illustrated, a pair of conductive laminations 66*a* and 66*b* are bonded by a pair of insulating layers 68 to the left-hand contact arm 38', and conductive laminations 66*c* and 66*d* are bonded to the right-hand contact arm 38'. These appear edgewise in FIG. 3 and can actually be of substantial width and thereby be of substantial cross section for heavy current-carrying capacity. Arms 38 (FIG. 1), 38' (FIG. 3) and conductors 66 are of high-conductivity non-ferous metal such as copper. The left-hand contact arm 38' is connected to conductor 66*c* by a first flexible connector 70, and the other end of that conductor 66*c* is connected by another flexible conductor 74 to conductor 66*a* on the left-hand contact arm 38'. Similarly conductor 66*a* on the left-hand contact arm 38' is connected by a flexible conductor 76 to the top of conductor 66*d* on the right-hand contact arm 38' and the bottom of conductor 66*d* is in turn connected to the conductor 66*b* of the left-hand contact arm by flexible conductor 78. The flexible conductors, particularly conductors 70 and 76, are looped to allow wide separation of the contacts.

The circuit may be traced through the device when the contacts have been separated in this path: In at the left-hand braid 46', up the left-hand contact arm 38', through flexible connector 70, down conductor 66*c*, through flexible connector 74, up the conductor 66*a*, through flexible connector 76, down conductor 66*d* on the right-hand contact arm 38', along connector 78, up conductor 66b on the left-hand contact arm, through one length of braid 48' and resistor 14', through the other braid 48', down the right-hand contact arm 38' and out through the right-hand braid 46'. It is seen that, assuming the current flows in the right-hand side of the device and out the left-hand side of the device, the currents through the conductors 66a and 66b and through the left-hand contact arm 38' are upward whereas the currents through the right-hand contact arm 38' and the conductors 66c and 66d are downward, in FIG. 3. The current that flows through the contact arms 38' and through the resistor 14' is thus seen to have a multiplied number of paths after contact separation, as compared to the two paths before separation. The increased number of paths multiply the electrodynamic forces that maintain contacts 40 separated from each other after they are separated. This force can readily be made greater than the force due to the unlimited, high current through the two contact arms alone before contact separation, by using the appropriate number and spacing of conductors 66, in relation to the current reduction. This arrangement is of special value where the short circuit current that is to be taken into account may be only marginal and where, therefore, the electrodynamic force tending to drive the contacts apart and interrupt arcing may be inadequate otherwise. The arrangement may be effectively proportioned to keep the contacts apart after they once separate. It is contemplated that, in the device of FIG. 3, the separating wedge structure 58, 60, 64 will be useful although it may actually be unnecessary in some instances. Where no wedge is used, as in the illustration of FIG. 3, the device is self-closing upon current interruption.

It is understood of course that in operation, when the contacts 40 or 40' part due to the electrodynamic operation described, that a certain amount of arcing developes and the interruption of the current is accompanied by dissipation of a substantial amount of energy in the momentary arc. The voltage developed across the dynamic contacts 10 reached over 200 volts in the operation of FIG. 5, before the arc was definitely interrupted. It may be desirable to reduce this value of voltage, or it may be desirable to use a low-voltage circuit breaker in a circuit where higher voltage is encountered. In any event, in order to minimize the voltage drop across the contacts bridged by the resistor, the electrodynamically operated contacts may be multiplied as illustrated in FIG. 4. In FIG. 4, the same numerals are used as in FIG. 1 except that the "one hundred" series of numbers is employed.

It is seen in FIG. 4 that there are five pairs of contacts 140 which are bridged by corresponding resistors 114. These contacts are carreid by contact arms 138 which extend in opposite directions from pivots 142. Considering the left-hand contact arm 138a in FIG. 4, it is clear that when this contact arm starts to swing counterclockwise, its upper parts swings in the same rotational direction as its lower part so that it is mechanically balanced dynamically. In FIG. 4, the left-hand pair of contact arms 138 are designated 138a and 138b. These are biased by spring 144a in reverse rotational directions. Spring 144a, as in FIG. 3, is insulated from the respective contact arms by appropriate bearings 180 of insulation.

The upper halves of arms 138a and 138b are close to each other and these have a strong repelling force during short-circuits, whereas the lower arms 138a and 138b, being far apart, have only a slight force tending to repel each other; so that when heavy currents flow, contacts 140a are blown apart and the resistor that bridges them (via flexible connectors 148) is injected into the circuit. The same arrangement is repeated so that all of the contacts 140 are electrodynamically separated and a series of resistors 114 are injected into the circuit. Furthermore, separation of contacts 140a results from contact-arm travel that promotes parting of contact pairs 140b and 140c.

Not only is the voltage and the energy divided among the contact pairs by the arrangement in FIG. 4, but there is the further advantage of providing a series of points at which the separate resistors 114 may dissipate heat, the terminals of those resistors serving as protective heat-sinks, to prevent excessive temperature rise.

When the device in FIG. 4 is in normal current-carrying condition, it is as shown in FIG. 4 and the current then passes from the left-hand braid 146 down the left-hand contact arm 138, up the next arm 138a, down the next arm 138b, and so forth to the right-hand braid 146. When a short circuit developes, the contact pairs 140 part and then the circuit extends not only along the contact arms in a zig-zag path, but through resistors 114. If the device of FIG. 4 is used in the circuit of FIG. 1 at the same line voltage, then resistors 114 would be much smaller in size and value than resistor 14.

It is contemplated that the current-path multiplying arrangement of FIG. 3 may be employed if warranted with multiple contact pairs for the combined advantages of both systems.

With reference to all three embodiments discussed above, there is a reverse bend in the current path that approaches and leaves the contacts both when the contacts are closed and when the contacts are in the process of separating and at such time are arcing. This arrangement of current paths has the important advantage of providing a powerful field tending to b'ow the arc upward in FIGS. 1 and 3 and respectively upward and downward for the various contact pairs in FIG. 4. When such arc starts to blow away from the contacts it forms a curved path and this rapidly expands and tends to blow itself out. It is evident that the earlier in each operation of contacts 40 that the arc can be interrupted the sooner will the resistor 14 become effective to limit the current through the circuit breaker. In the physical design of each embodiment of electrodynamically operated contacts the provision of an arc chute incorporating magnetic plates for sub-dividing the arc accordingly becomes of doubtful value, and it is contemplated that the expanding arc be suitably directed to a space where it can be extinguished and where it will not damage other structures as conductors 70 and 76 in FIG. 3.

It was mentioned above that the contact arms 138 in FIG. 4 are mechanically balanced dynamically. This construction is advantageous in developing somewhat greater contact-parting speeds when the electrodynamic force exceeds the spring bias of the contacts, because of elimination of unnecessary masses connected to the contact arms which unnecessary masses do not contribute to the electrodynamic separating force. Thus the flexible connectors 46 and 46' as well as the tails of the contact arms to which those flexible connectors are joined are all omitted from the embodiment of FIG. 4. The higher contact separating speeds are of importance for several reasons including the increased speed and distance of separation of the contacts which promotes the quenching of the arc; and the fast limiting current that results from the earlier insertion of the resistance after a moment of short circuit is an advantage in protecting the circuit breaker.

In the device of FIG. 4 the resistance of resistors 114 may be made individually equal to resistor 14, or the total values of resistors 114 may equal resistor 14 or some compromise total value of resistors 14 may be selected. In the event that each resistor 114 is a small fraction of that of resistor 14 then the voltage drop across any one contact pair in FIG. 4 (for a given short circuit current) will be much lower than that in FIG. 1 across contacts 40. The lower value of voltage tending to sustain the arc is an advantage in reducing the difficulty of extinguishing the arc, in speeding the arc interruption, and in minimizing the damage to the contacts that results from the arc. Where a higher value of resistance is used at each resistor 114 than the small fraction of resistor 14, then the device of FIG. 4 in series with the circuit breaker will take a much larger share of the voltage impressed across the series circuit including this device and the circuit breaker, and consequently greater protection for the circuit breaker, particularly the contacts thereof, is afforded.

In FIG. 1 the circuit breaker and the current-limiting device are illustrated as being separate units. It is however contemplated that each current-limiting device in FIGS. 1, 3 and 4 may be physically incorporated into a circuit breaker as an integral portion thereof. Thus one of the arms 38 in FIG. 1 may be physically and electrically connected to the lower contact 28 of the circuit breaker proper.

In each of the embodiments described above the contact-bearing arms 38, 38' and 138 are of copper or brass or like non-ferrous high-conductivity metal. The forces developed electrodynamically result without delay from the direct mutual effects of the currents carried by those contact-bearing conductors. No structure additional to the contact arms themselves is essential to the operation described. This basic simplicity is an important aspect of one feature of the invention.

The foregoing disclosure of various embodiments of the invention involve a number of features of novelty which may be variously modified and differently applied by those skilled in the art. Consequently, it is appropriate that the invention be broadly construed in accordance with its full spirit and scope.

Having thus described my invention, what I claim and desire to secure by Letters Patent is:

1. Circuit protective apparatus, comprising relatively movable companion contacts, spring biasing means arranged to be normally effective to hold said contacts closed, relatively movable conductors disposed in electrodynamic repelling relation respectively electrically and mechanically connected to said contacts for disengaging them from each other upon relative movement of said conductors when the current is at a predetermined value, and current limiting conductive means bridging said contacts and connected in series with said conductors and normally shortcircuited directly by the contacts in their normally closed condition and providing a current path of increased impedance through said conductors when said contacts are disengaged from each other by said relative movement of said conductors by said electrodynamic operation thereof, the arcing current being repelled by the currents in said conductors and the arc formed during electrodynamic parting of the contacts being thereby blown out.

2. Circuit protective apparatus, comprising relatively movable companion contacts, spring biasing means arranged to be normally effective to hold said contacts closed, relatively movable conductors disposed in mutual electrodynamic repelling relation electrically and mechanically connected to said contacts for disengaging them from each other upon relative movement of said conductors when the current is at a predetermined value, and current limiting conductive means bridging said contacts and connected in series with said conductors and normally short-circuited directly by the contacts in their normally closed condition and providing a reduced current path through said conductors when said contacts are disengaged from each other by said relative movement of said conductors by said electrodynamic operation thereof, and means associated with said contacts and rendered effective upon separation thereof for releasably preventing reclosing of said contacts when opened electrodynamically by marginally contact-disengaging currents.

3. Circuit protective apparatus, comprising relatively movable companion contacts, spring biasing means arranged to be normally effective to hold said contacts closed, relatively movable conductors disposed in electrodynamic repelling operative relation electrically and mechanically connected to said contacts for disengaging then from each other upon relative movement of said conductors when the current is at a predetermined value, and current limiting conductive means bridging said contacts and being connected in series with said conductors and normally short-circuited directly by the contacts in their normally closed condition and providing a current path of increased impedance through said conductors when said contacts are disengaged from each other by said relative movement of said conductors by said electrodynamic operation thereof, and retractable means mounted for movement in relation to said contacts and automatically operable to releasably prevent them from reclosing due to decrease in the electrodynamic force following said electrodynamically operative disengagement of the contacts, said last mentioned means comprising insulating means biased to move from a retracted position when the contacts are closed to a projected position when the contacts are disengaged from each other.

4. Circuit protective apparatus, comprising relatively movable companion contacts, spring biasing means arranged to be normally effective to hold said contacts closed, relatively movable conductors disposed in electrodynamic repelling relation operatively connected electrically and mechanically to said contacts for disengaging them from each other upon relative movement of said conductors when the current is at a predetermined value, and current limiting conductive means bridging said contacts and connected in series electrically with said conductors and normally short-circuited directly by the contacts in their normally closed condition and providing a current path of increased impedance through said conductors when said contacts are disengaged from each other by said relative movement of said conductors by said electrodynamic operation thereof, and retractable means mounted for movement in relation to said contacts and automatically operable to releasably prevent them from reclosing due to decrease in the electrodynamic force following said electrodynamically operative disengagement of the contacts, said last mentioned means comprising insulating wedge means biased to move from a retractable position when the contacts are closed to a projected position between said contacts when the latter are disengaged from each other, said insulating means having provision to prevent movement thereof to said projected position unless the extent of disengagement of said contacts exceeds a predetermined value.

5. Circuit protective apparatus, comprising relatively movable companion contacts, spring biasing means arranged to be normally effective to hold said contacts closed, relatively movable conductors disposed in electrodynamic repelling operative relation electrically and mechanically connected to said contacts for disengaging them from each other upon relative movement of said conductors when the current is at a predetermined value, and current limiting conductive means bridging said contacts and electrically connected in series with said conductors and normally short-circuited directly by the contacts in their normally closed condition and providing a current path of increased impedance when said contacts are disengaged from each other by said relative movement of said conductors by said electrodynamic operation thereof, and means associated with said contacts for releasably preventing reclosing of said contacts due to decrease in the electrodynamic force following said electrodynamically operative disengagement of the contacts, said last mentioned means comprising additional electrodynamically operative means constituting at least part of said normally short-circuited current limiting means and automatically operable upon disengagement of said contacts and acting on said conductors to supplement the decreased electrodynamic force acting initially to part the contacts, the decreased force being due to decrease of current resulting from said increased impedance, whereby to releasably prevent self-closing of said contacts until the current drops below a predetermined value.

6. Circuit protective apparatus, comprising relatively movable companion contacts, spring biasing means arranged to be normally effective to hold said contacts closed, relatively movable conductors disposed in electrodynamic repelling relation operatively connected to said contacts electrically and mechanically for disengaging them from each other upon relative movement of said conductors when the current is at a predetermined value, and current limiting conductive means bridging said contacts and in series with said conductors but normally short-circuited by the contacts in their normally closed condition and providing a current path of increased impedance when said contacts are disengaged from each other by said relative movement of said conductors by said electrodynamic operation thereof, and means associated with said contacts for releasably preventing reclosing of said contacts due to decrease in the electrodynamic force following said electrodynamically operative disengagement of the contacts, said last mentioned means comprising additional electrodynamically operative means constituting at least part of said normally short-circuited current limiting means and automatically operable upon disengagement of said contacts to augment the electrodynamic action tending to separate said conductors and thereby oppose the effect of decrease in the electrodynamic force due to decrease of current resulting from said increased impedance, whereby to releasably prevent self-closing of said contacts until the current drops below a predetermined value.

7. Circuit protective apparatus, comprising relatively movable companion contacts, spring biasing means arranged to be normally effective to hold said contacts closed relatively movable conductors disposed in electrodynamic repelling relation operatively connected to said contacts electrically and mechanically for disengaging them from each other upon relative movement of said conductors when the current is at a predetermined value, and current limiting conductive means bridging said contacts and in series with said conductors but normally short-circuited by the contacts in their normally closed condition and providing a current path of increased impedance when said contacts are disengaged from each other by said relative movement of said conductors by said electrodynamic operation thereof, and means associated with said contacts for releasably preventing reclosing of said contacts due to decrease in the electrodynamic force following said electrodynamic operative disengagement of the contacts, said last mentioned means comprising additional electrodynamically operative means in series with said current-limiting means and normally short-circuited by said contacts and automatically operable upon disengagement of said contacts to augment the electrodynamic action tending to separate said conductors and thereby oppose the effect of decrease in the electrodynamic force due to decrease of current resulting from said increased impedance, whereby to releasably prevent self-closing of said contacts until the current drops below a predetermined value.

8. Circuit protective apparatus, comprising relatively movable companion contacts, spring biasing means arranged to be normally effective to hold said contacts closed, relatively movable conductors disposed in electrodynamic repelling relation operatively connected to said contacts electrically and mechanically for disengaging them from each other upon relative movement of said conductors when the current is at a predetermined value, and current limiting conductive means bridging said contacts and electrically connected in series with said conductors and normally short-circuited by the contacts in their normally closed condition and providing a current path of increased impedance when said contacts are disengaged from each other by said relative movement of said conductors by said electrodynamic operation thereof, and normally short-circuited electrodynamic means associated with said contacts automatically operable upon said electrodynamically disengagement thereof to oppose the effect of decrease in the electrodynamic force due to decrease of current resulting from said increase impedance, whereby to releasably prevent self-closing of said contacts until the current drops below a predetermined value, and insulating means biased to move from a retracted position when the contacts are closed to a projected position for releasably preventing said contacts from reclosing when the current drops below a predetermined value following the electrodynamic disengagement thereof.

9. Circuit protective apparatus, comprising relatively movable companion contacts, spring biasing means arranged to be normally effective to hold said contacts closed, relatively movable conductors disposed in electrodynamic repelling relation operatively connected to said contacts electrically and mechanically for disengaging them from each other upon relative movement of said conductors when the current is at a predetermined value, and current limiting conductive means bridging said contacts electrically connected in series therewith and normally short-circuited by the contacts in their normally closed condition and providing a current path of increased impedance when said contacts are disengaged from each other by said relative movement of said conductors by said electrodynamic operation thereof, and means associated with said contacts automatically operable upon said electrodynamically disengagement thereof to oppose temporarily the mechanical effect of decrease in the electrodynamic force due to decrease of current resulting from said increased impedance, whereby to releasably prevent self-closing of said contacts until the current drops below a predetermined value, said last mentioned means comprising additional electrodynamically operative means normally inactive when said contacts are engaged and automatically activated when the contacts are disengaged by the electrodynamic effect of said relative movable conductors for augmenting the electrodynamic action of the latter, said additional electrodynamically operative means being carried by said relatively movable conductors and automatically connected in said path of increased impedance when said contacts are disengaged.

10. Circuit protective apparatus, comprising a plurality of sets of relatively movable companion contacts arranged in series circuit relation, spring biasing means arranged to be normally effective to hold said contacts closed, relatively movable conductors disposed in electrodynamic mutually repelling relation and operatively connected electrically and mechanically to said companion contacts of said sets, respectively, for disengaging said companion contacts when the current in said conductors is at a predetermined value, and a plurality of current limiting impedances connected electrically in series with said conductors and normally short-circuited directly by said companion contacts of said sets, respectively, and automatically connected in series with said conductors and in current conductive relation across the companion contacts of said sets, respectively, by said electrodynamic disengagement of said companion contacts.

11. Circuit protective apparatus, comprising a plurality of sets of relatively movable companion contacts arranged in series circuit relation, relatively movable conductors disposed in electrodynamic mutually repelling relation and operatively connected electrically and mechanically to said companion contacts of said sets, respectively, for disengaging said companion contacts when the current in said conductors is at a predetermined value, and a plurality of current limiting impedances normally short-circuited by said companion contacts of said sets, respectively, and automatically connected in series with said conductors and in current conductive relation across the companion contacts of said sets, respectively, by said electrodynamic disengagement of said companion contacts, and spring means acting on said pivotally movable members at both sides of their pivots with substantial equal force and biasing the adjacent ends of said companion members toward each other for releasably holding the companion contacts of each set in said normally closed relation and for opposing movement thereof to disengaged position.

12. Circuit protective apparatus, comprising a plurality of sets of relatively movable companion contacts arranged in series circuit relation, spring biasing means arranged to be normally effective to hold said contacts closed, relatively movable conductors disposed in electrodynamic mutually repelling relation and operatively connected electrically and mechanically to said companion contacts of said sets, respectively, for disengaging said companion contacts when the current in said conductors is at a predetermined value, and a plurality of current limiting impedances normally short-circuited by said companion contacts of said sets, respectively, and connected electrically in series with said conductors and automatically connected in series with said conductors and in current conductive relation across the companion contacts of said sets, respectively, by said electrodynamic disengagement of said companion contacts, and means associated with said conductors for releasably preventing reclosing of said contacts due to decrease in the electrodynamic force following said electrodynamically operative disengagement of the contacts.

13. Circuit protective apparatus, comprising relatively movable companion contacts, spring biased means arranged to be normally operative to maintain said contacts closed, relatively movable conductors disposed in electrodynamic repelling relation operatively connected to said contacts for disengaging them from each other upon relative movement of said conductors when the current is at a predetermined value, and current limiting conductive means bridging said conductors and connected electrically in series with said conductors and normally short-circuited by the contacts in their normally closed condition and providing a current path of increased impedance when said contacts are disengaged from each other by said relative movement of said conductors by said electrodynamic operation thereof, and current controlled circuit-breaking means electrically in series with the current-limiting means and having a substantially slower-acting characteristic than that of said relatively movable conductors, said contacts, and said current-limiting conductive means so as to be effective to interrupt the circuit following the electrodynamic disengagement of said contacts.

14. In combination, a circuit breaker having overload tripping means and effective to interrupt the protected circuit after a predetermined time delay, and current-limiting means connected in series with said circuit breaker, said current-limiting means including an electrodynamically operated device having a pair of contacts, means for biasing said contacts toward each other and normally operative to hold said contacts against each other, said biasing means being ineffective to hold the contacts together against electrodynamic forces developed at current levels greater by a substantial margin than the normal load-protecting rating of the circuit breaker, and an impedance element bridging said contacts and injected in series with the circuit breaker upon electrodynamic separation of the contacts, the separation of the electrodynamically operated contacts being at least as fast as the tripping and opening of the circuit breaker.

15. In combination, a circuit breaker of the type having a thermal tripping device causing opening of the circuit breaker in response to a thermal-tripping current level, said thermal tripping device being effective after a substantial time delay, a magnetic tripping device effective to release the circuit breaker at a current level many times in excess of the thermal tripping rating and operative to effect such release during the first full half cycle of such excess current, said circuit breaker having a pair of contacts and operating mechanism therefor controlled by said tripping devices and said contacts effecting circuit interruption after an inherent time delay following release, a pair of current-limiting contacts connected in series with said circuit breaker, and a current-limiting impedance bridging said contacts, said contacts being proportioned in relation to the circuit breaker to open and inject the impedance in series with the circuit breaker prior to the mechanical parting of the circuit breaker contacts, said current-limiting contacts having electrodynamically repelling supporting conductors proportioned to separate the contacts electrodynamically, but only at current levels greatly in excess of the thermal tripping-level currents.

16. In the combination of circuit protective apparatus comprising an automatic circuit breaker provided with current responsive trip means operable to control the circuit breaker mechanism for the operation thereof, to disengage the circuit-controlling contacts thereof under excess current conditions of the circuit, and means automatically operable in response to predetermined current conditions of the circuit to limit the current passing through said contacts at or immediately before the time when they are disengaged pursuant to the operation of said trip means and until the current therethrough is interrupted, that improvement in the last-named means comprising relatively movable conductors disposed in electrodynamic mutually repelling relation, relatively movable contacts engageable with and disengageable from each other in series with said relatively movable conductors and mechanically supported on said conductors so as to be operable thereby, spring biasing means opposing electrodynamic forces developed between said conductors and arranged and normally effective to hold the contacts closed, and current-limiting impedance means normally short-circuited by said last mentioned contacts when in engagement and introduced into the circuit of the circuit breaker when said contacts are disengaged, said last mentioned contacts remaining engaged or becoming disengaged in accordance with the balance of the electrodynamic forces due to current conditions of said conductors and said opposing spring bias, and means rendered operative by contact-opening operation of said conductors to hold said contacts apart at least until the circuit breaker has interrupted the circuit.

17. Electrodynamic switching apparatus including a pair of contacts at least one of which is movably carried by a conductive arm, a conductor connected in series with said contacts and said arm and arranged relative to said arm to operate said movable conductive arm electrodynamically, for separation of the contacts, and at least one additional conductor connected in a circuit directly bridging said contacts and normally short-circuited by those contacts when closed, said additional conductor being mechanically united to said arm and disposed to provide supplemental electrodynamic operating force for said movable conductive arm after the contacts are initially separated.

18. Switching apparatus including a pair of conductive arms having respective pivots adjacent each other and extending in generally parallel relationship from said pivots toward opposing ends thereof, a pair of companion contacts respectively mounted on said arms at said opposing ends, spring bias means normally holding said contacts in engagement, and circuit means bridging said contacts and connected thereto adjacent the respective mountings of said contacts on said arms and electrically in series with said arms, said arms having electrical connections thereto remote from said contacts for carrying current in a path having a reverse bend at such contacts prior to the opening thereof and during the parting thereof so long as arcing remains, and said arms thereafter carrying the current passed by said bridging circuit means.

19. A pair of conductors extending generally parallel to each other, a pair of contacts normally in engagement with each other and carried by said conductors at opposed ends thereof, current supplying connections to said conductors at points spaced from said contacts whereby current flows along a path having a reverse bend to and from the contacts, additional conductors mechanically united to the forementioned conductors but insulated therefrom, said additional conductors being electrically connected serially so as to form a coil and being connected to said conductors adjacent said contacts to form additional series-connected current-carrying paths in mutually repelling electrodynamic relationship when the contacts have parted.

20. Circuit protective apparatus, comprising a plurality of sets of relatively movable companion contacts, arranged in series circuit relation, a contact-carrying conductive arm between each pair of contacts in the series circuit and the next pair in the series, spring biasing means acting on said arms in the contact-closing direction and normally operated to hold the companion contacts closed, at least one arm of each pair of contacts being centrally pivoted, said conductive arm having respective contacts at its extremities, said conductive arms being normally disposed in zig zag relation and a bridging impedance permanently connected in series with said arm and across a respective pair of contacts to be short-circuited thereby when the contacts are engaged.

21. Circuit protective apparatus, comprising a large plurality of sets of normally closed relatively movable companion contacts, arranged in series circuit relation, a centrally pivoted contact-carrying conductive arm between each pair of contacts in the series circuit and the next pair in the series, each said conductive arm having respective contacts at its extremities, said conductive arms being normally disposed in zig zag relation, and compression springs confined between each conductive arm and the next conductive arm of the series at the ends remote from the mutually engaging contacts thereof.

22. Circuit protective apparatus, comprising a plurality of sets of normally closed relatively movable companion contacts, arranged in series circuit relation, a centrally pivoted contact carrying conductive arm between each pair of said contacts and the next pair in the series, said conductive arm having respective contacts at its extremities, said conductive arms being normally disposed in zig zag relation, and compression springs confined between each conductive arm and the next conductive arm of the series on the sides of the pivots thereof remote from the mutually engaging contacts thereof, a series of current limiting impedance elements having flexible conductors connected to said centrally pivoted conductive arms at respective points adjacent said contacts so as to be short-circuited by said contacts when closed and so as to be in series-circuit connection with said pivoted conductive arms when said contacts are open.

23. In circuit protective apparatus comprising an automatic circuit breaker provided with current responsive means operable to control the automatic opening of the circuit breaker upon predetermined excess current conditions of the circuit, normally inactive impedance-increasing means adapted to be activated in the circuit, and means operable to render said impedance-increasing means active in the circuit automatically in response to said predetermined excess current conditions of the circuit at a time not later than the automatic operation of said circuit breaker to interrupt the circuit, that improvement wherein the last-named means comprises relatively movable conductors disposed in electrodynamic repelling relation operatively connected to said contacts for disengaging them from each other upon relative movement of said conductors when the current is at a predetermined value, said normally inactive impedance-increasing means comprising current limiting conductive means bridging said contacts and normally short-circuited by the latter in their normally closed condition and providing a current path of increased impedance when said contacts are disengaged from each other by electrodynamic operation of said conductors as aforesaid.

24. Circuit protective apparatus, comprising an automatic circuit breaker provided with current responsive trip means operable to control the circuit breaker mechanism for the operation thereof to disengage the circuit-controlling contacts thereof under excess current conditions of the circuit, and means automatically operable in response to predetermined current conditions of the circuit to limit the current passing through said contacts at or immediately before the time they are disengaged pursuant to the operation of said trip means, comprising relatively movable conductors disposed in electrodynamic mutually repelling relation and provided with relatively movable contacts engageable with and disengageable from each other, and having spring biasing means opposing electrodynamic forces developed between said conductors and normally operative to hold the contacts closed, current-limiting means normally short-circuited by said last mentioned contacts when in engagement and introduced into the circuit of the circuit breaker when said contacts are disengaged, said last mentioned contacts being biased for engagement with and disengagement from each other in accordance with the balance of said spring bias and the electrodynamic forces due to current conditions of said conductors, so that said contacts are disengaged and said current limiting conductive means is introduced into the circuit of said circuit breaker in response to said predetermined current conditions, said automatically operable current limiting means being proportioned in relation to the circuit breaker mechanism so that the contacts of said circuit breaker remain closed temporarily after said actuation of the circuit breaker and until said current limiting means is introduced into the circuit of said circuit breaker.

References Cited in the file of this patent

UNITED STATES PATENTS

| | | |
|---|---|---|
| 1,100,134 | Jacobson | June 16, 1914 |
| 1,358,701 | Boddie | Nov. 16, 1920 |
| 1,364,944 | McInnerney | Jan. 11, 1921 |
| 1,724,840 | Jones | Aug. 13, 1929 |
| 2,654,053 | Wallace | Sept. 29, 1953 |
| 2,673,264 | Cole | Mar. 23, 1954 |
| 2,675,505 | Flurscheim | Apr. 13, 1954 |
| 2,813,166 | Wallace | Nov. 12, 1957 |
| 2,823,338 | Edsall | Feb. 11, 1958 |

FOREIGN PATENTS

| | | |
|---|---|---|
| 165,563 | Great Britain | July 7, 1921 |
| 187,993 | Great Britain | July 12, 1923 |
| 568,129 | France | Mar. 17, 1924 |
| 983,184 | France | June 20, 1951 |